(12) United States Patent
Rosenfeld et al.

(10) Patent No.: US 7,941,351 B1
(45) Date of Patent: May 10, 2011

(54) EMPLOYEE-BASED PAYROLL

(75) Inventors: Paul J. Rosenfeld, Mountain View, CA (US); Terry Hicks, Mountain View, CA (US); Roy Goldman, Cupertino, CA (US); Kevin M. Reeth, II, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 1084 days.

(21) Appl. No.: 11/592,794

(22) Filed: Nov. 3, 2006

(51) Int. Cl.
| | |
|---|---|
| *G07B 17/00* | (2006.01) |
| *G07F 19/00* | (2006.01) |
| *G06F 17/22* | (2006.01) |
| *G06F 15/02* | (2006.01) |
| *G07C 1/10* | (2006.01) |

(52) U.S. Cl. .................. 705/30; 705/31; 705/32
(58) Field of Classification Search .................. None
See application file for complete search history.

(56) References Cited

U.S. PATENT DOCUMENTS

| | | | |
|---|---|---|---|
| 5,953,709 | A | 9/1999 | Gilbert et al. |
| 6,401,079 | B1 | 6/2002 | Kahn et al. |
| 6,411,938 | B1 | 6/2002 | Gates et al. |
| 6,764,013 | B2 | 6/2004 | Ben-Aissa |
| 6,829,588 | B1 | 12/2004 | Stoutenburg et al. |
| 2001/0034676 | A1 | 10/2001 | Vasic |
| 2002/0022982 | A1 * | 2/2002 | Cooperstone et al. ............ 705/7 |
| 2003/0074311 | A1 | 4/2003 | Saylors et al. |
| 2003/0229522 | A1 * | 12/2003 | Thompson et al. ............... 705/4 |
| 2003/0236746 | A1 | 12/2003 | Turner et al. |
| 2004/0049436 | A1 | 3/2004 | Brand et al. |
| 2004/0111361 | A1 | 6/2004 | Griffiths et al. |

OTHER PUBLICATIONS

McCausland, R., "HR Software Angles for a Promotion", Accounting Technology. Boston, Jan. 2003, vol. 19, Issue 1, 8 pages.
DePasquale, E., "Criteria on Report Screen Adds to Efficient Processing", NPA magazine, Apr. 2006, 1 page.
Knaster, B., "The Return of Payroll", Accounting Technology, Boston, Apr. 2006, vol. 22, Issue 3, 7 pages.
Rose, T. A., CPA, "ADP EasyPay Makes Payroll Efficient for Small Businesses", NPA magazine, Apr. 2006, 1 page.

* cited by examiner

*Primary Examiner* — F. Zeender
*Assistant Examiner* — H Rojas
(74) *Attorney, Agent, or Firm* — Osha • Liang LLP

(57) ABSTRACT

A method for providing payroll services to an employer includes obtaining employee data for an employee of the employer, wherein the employee data is used by a payroll system, obtaining employer tax data of the employer, wherein the employer tax data is used by the payroll system, and managing a payroll and taxes of the employer using the payroll system, wherein managing the payroll of the employer comprises issuing a direct deposit paycheck by the payroll system based on the employee data and employer tax data, wherein managing the payroll of the employer and taxes of the employer is provided by the payroll system without cost to the employer.

11 Claims, 5 Drawing Sheets

EMPLOYEE-BASED PAYROLL

CROSS-REFERENCE TO RELATED APPLICATIONS

The present application contains subject matter that may be related to the subject matter in the following U.S. Patent filed on the same date as the present application, and assigned to the assignee of the present application: "Method and System for Generating and Processing an Electronic Paycheck Voucher" with U.S. Pat. No. 7,761,370 by inventors Paul Rosenfeld and Terry Hicks.

BACKGROUND

Payroll is a series of accounting transactions centered around making payments to employees for services rendered. In addition to calculating a basic hourly wage or salary for an employee, an employer must also disburse as gross pay any commission, bonuses, vacation pay, sick leave, or other compensation. On the other hand, the employer is responsible for withholding various debits from the employee's gross pay, including income tax, other taxes (such as social security and Medicare), health insurance, union dues, pension plan contributions, and other deductions.

After the appropriate deductions have been removed from the gross pay, the employee is paid the remaining amount, known as net pay. The net pay is typically disbursed to the employee in the form of cash, a handwritten check, a printed check, as a direct deposit into the employee's bank account, or some other form of electronic transfer. Along with the disbursement of payment, the employee may receive a pay stub detailing the gross income as well as the deductions for the current pay period. The pay stub may also include year to date totals for important items on the paycheck, such as gross pay, income tax withholding, social security withholding, Medicare withholding, deductions, and other details.

In addition to calculating and paying employees' net income, the employer is also responsible for transferring deducted amounts from employee paychecks, as well as making additional monetary contributions, to the appropriate organizational (i.e., governmental) bodies. For example, the employer must send portions of the employee's withholdings and any employer matching contributions to: (1) the Internal Revenue Service (IRS) as tax payments, (2) the insurance plan administrator for the group health care plan to which the employer is enrolled as health insurance payments, (3) any retirement plans, such as 401k plans, offered by the employer (including matching funds) as funding payments, and (4) any other entity for payment of any additional expenses.

Businesses may choose to process payroll by hand, by using accounting software, and/or by hiring a payroll service to handle the payroll needs of the company or small business. Small businesses with very few employees often perform payroll by hand, while small businesses with greater numbers of employees tend to use off-the-shelf payroll software or the assistance of a payroll service. Larger corporations tend to use payroll modules found within Human Resources Management Systems (HRMS), which may be client/server based software systems for streamlining and automating many aspects of human resources (HR) management.

SUMMARY

In general, in one aspect, the invention relates to a method for providing payroll services to an employer, comprising obtaining employee data for an employee of the employer, wherein the employee data is used by a payroll system, obtaining employer tax data of the employer, wherein the employer tax data is used by the payroll system, and managing a payroll and taxes of the employer using the payroll system, wherein managing the payroll of the employer comprises issuing a direct deposit paycheck by the payroll system based on the employee data and employer tax data, wherein managing the payroll of the employer and taxes of the employer is provided by the payroll system without cost to the employer.

In general, in one aspect, the invention relates to a method for providing payroll services to an employee using a payroll system, comprising sending a direct deposit paycheck for the employee from the payroll system to a payroll account, and sending an allocation of funds specified by the employee from the payroll account to a fund recipient, wherein the payroll account is established within the payroll system.

In general, in one aspect, the invention relates to a method for providing client access to an accountant, comprising enrolling the accountant in a payroll system, wherein the payroll system manages a payroll and taxes of an employer without cost to the employer, obtaining an access fee based on a level of visibility specified by the accountant to the payroll system, and sending a list of business clients and consumer clients to the accountant, wherein the list of business clients comprises employers in the payroll system, and wherein the list of consumer clients comprises employees in the payroll system.

In general, in one aspect, the invention relates to a method for managing a payroll using a payroll system, comprising enrolling an employer in the payroll system that provides payroll services, obtaining employee data for an employee of the employer, obtaining employer tax data of the employer, managing the payroll and taxes of the employer using the payroll system wherein the payroll system manages a payroll and taxes of the employer without cost to the employer, sending a direct deposit paycheck for the employee from the payroll system to a payroll account, and sending an allocation of funds specified by the employee from the payroll account to a fund recipient, wherein the payroll account is established within the payroll system, enrolling an accountant in the payroll system, obtaining an access fee based on a level of visibility specified by the accountant to the payroll system, and sending a list of business clients and consumer clients to the accountant, wherein the list of business clients comprises employers in the payroll system, and wherein the list of consumer clients comprises employees in the payroll system.

In general, in one aspect, the invention relates to a payroll system, comprising an employer data repository configured to store information about an employer, an employer interface for accessing the employer repository and an employee repository by the employer, and an identity management system configured to synchronize changes between the employer data repository and the employee data repository, wherein a payroll and taxes of the employer are processed using the employer interface, and wherein managing the payroll and taxes of the employer is provided by the payroll system without cost to the employer.

In general, in one aspect, the invention relates to a computer readable medium containing software instructions embodied therein for causing a computer system to perform sending a direct deposit paycheck for the employee from the payroll system to a payroll account, and sending an allocation of funds specified by the employee from the payroll account to a fund recipient, wherein the payroll account is established within the payroll system.

In general, in one aspect, the invention relates to a method for providing benefits to a client of a payroll system, comprising obtaining information about a benefit provider using the payroll system, wherein the information comprises benefit information, providing the benefit information to the client through the payroll system, enrolling the client in a benefit of the benefit provider, sending client information from the payroll system to the benefit provider, and deducting a cost of the benefit and a management fee from a paycheck of the client, wherein the payroll system uses the management fee to provide a payroll service without cost to an employer of the client.

Other aspects of the invention will be apparent from the following description and the appended claims.

DETAILED DESCRIPTION

Figure 1:
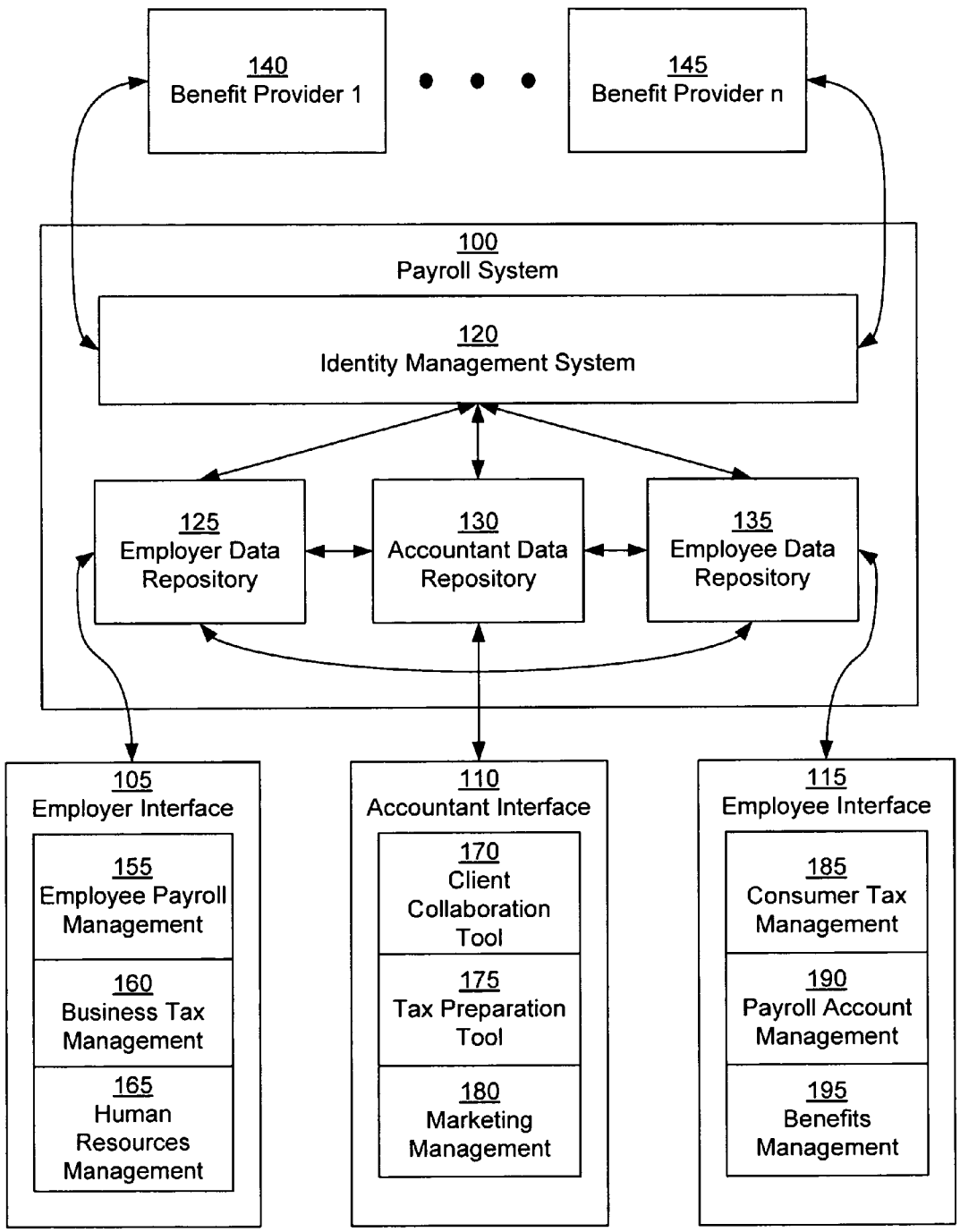
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to provide payroll services to employers, employees, and accountants. Embodiments of the invention allow employers to pay employees through a centralized payroll system. In addition, accountants are able to enroll in the system and provide services, such as tax preparation and counseling, to both employers and employees.

Specifically, embodiments of the invention provide a method and apparatus to provide basic payroll services to employers at no cost. Employers may also choose to purchase one or more bonus features in accordance with embodiments of the invention, such as electronic filing and electronic payment of taxes. Using one or more embodiments of the invention, employees receive paychecks through direct deposit and are able to manage their paycheck funds via user accounts on the payroll system. In addition, employees may choose to enroll in one or more benefits provided by the payroll system, which automatically deducts withholdings for those benefits from the employees' paychecks. Accountants are able to provide services to employers and employees by paying for lists of clients from the payroll system. An identity management module in the payroll system provides and synchronizes information between the employers, employees, accountants, and benefit providers, allowing each party to communicate and interact with the others efficiently and accurately. In one or more embodiments of the invention, the basic payroll services are funded by charging employers for bonus features, charging employees for receiving benefits through the payroll system, and charging accountants for access to employers and employees in the payroll system.

FIG. 1 shows a schematic diagram of a system in accordance with one or more embodiments of the invention. As shown in FIG. 1, the system includes a payroll system (100), multiple benefit providers (e.g., benefit provider 1 (140), benefit provider n (145)), an employer interface (105), an accountant interface (110), and an employee interface (115). Each of these components is described below.

The payroll system (100) provides payroll and accounting services to users through various interfaces (e.g., the employer interface (105), accountant interface (110), employee interface (115), etc). As specified by the interface names, the employer interface (105) is mainly used by employers, the employee interface (115) is accessed by employees, and the accountant interface (110) is designed for use by accountants. The interfaces allow the user of the payroll and/or accounting services to interact with various components of the payroll system (100) using a user-friendly environment (e.g., a graphical user interface). Further, because of the sensitive nature of payroll information, these interfaces are often secure connections employing various known techniques for keeping sensitive information secure.

In one or more embodiments of the invention, the payroll system (100) is implemented using a client-server architecture. The payroll system (100) itself may be an enterprise application running on one or more servers, and in some embodiments could be a peer to peer system, or resident upon a single computing system. In addition, the payroll system (100) is accessible from other machines using the employer interface (105), accountant interface (110), or employee interface (115). In one or more embodiments of the invention, the employer interface (105), accountant interface (110), and employee interface (115) are web pages that can be reached from a computer with a web browser and internet connection. Alternatively, the employer interface, employer interface (105), accountant interface (110), and employee interface (115) are applications that reside on computing systems, which may include personal computers (PCs), mobile phones, personal digital assistants (PDAs), and other digital computing devices of the respective users, and that communicate with the payroll system (100) through one or more network connections and protocols. Regardless of the architecture of the system, communications between the payroll system (100) and the interfaces may be secure, as described above.

The payroll system (100) also includes an employer data repository (125), accountant data repository (130), employee data repository (135), and identity management system (140). The employer data repository (125) includes data about employers in the payroll system (100). For example, for each employer in the payroll system (100), the employer data repository (125) may include an entry with information such as business name, number of employees, a list of employees and their wages, the corporate income tax rate of the business, deductions, and/or other information relevant to the business and its accounting and payroll practices. By accessing the employer interface (105), an employer is able to enroll in the payroll system (100) and add, update, or delete information in the employer data repository (125). For example, an employer may choose to add a new employee, remove an employee's records after he/she has left the company, or update the number of employees in the company after personnel changes.

Similarly, the employee data repository (135) stores information about employees in the payroll system (100). Entries in the employee data repository (135) may correspond to individual employees. Further, each entry may contain information about the employee, such as last name, first name, address, age, social security number, annual income, tax filing status, tax bracket, company of employment, bank and brokerage account numbers, and/or other information related to the employee and the employee's finances. In one or more embodiments of the invention, an entry in the employee data repository is created for a new employee of a company using the payroll system (100). The employee can then use the employee interface (115) to update his/her information (e.g., change in address, marital status, income, or other personal information) and preferences in the payroll system (100). In one or more embodiments of the invention, the employee data repository (135) is linked to the employer data repository (125). Changes to either repository are correspondingly updated in the other repository.

For example, if an employee has left a company, the employer may delete the employee from the employee roster stored in the company's entry in the employer data repository (125). The payroll system (100) then automatically updates the employee's entry in the employee data repository (135) to reflect the employee's change in employment at the company. Alternatively, the employee may first update his employment status through the employee interface (115). The change is then transferred over to the employer data repository (125) from the employee data repository (135). In one or more embodiments of the invention, restrictions may be put in place against updating certain fields of information by certain parties. For example, an employee may not be able to change his company of employment in his employee data repository (135) entry without the consent of the old and/or new employer. At the same time, if an employee has changed jobs from one company in the payroll system (100) to another company in the payroll system (100), the employee's information may be automatically entered in the new company's employer data repository (125) by porting the information from the previous company's entry in the employer data repository (125) and/or the employee's entry in the employee data repository (135). Such portability of employee benefit information provides the employee and employer with the convenience of leveraging existing data to populate the data repository and avoid time-consuming paperwork.

The accountant data repository (130) contains entries corresponding to accountants in the payroll system (100). As with the employer data repository (125) and employee data repository (135), an accountant may enter, update, and delete his/her entry in the accountant data repository (130) through the accountant interface (110). Information in the accountant data repository (130) may include the accountant's name and contact information, education and credentials, services offered, a list of clients that use the accountant's services, and/or other information relevant to the providing of accounting services. Further, if the accountant is given permission by the employee and/or employer, the accountant is able to access information related to the employee and/or employer that is stored in a data repository (e.g., employer data repository (125), accountant data repository (130), employee data repository (135)) associated with the payroll system (100). For example, the accountant's access to information is scalable by granting version level of permissions to the accountant depending on the employee preference, the employer preference, security concerns, and other factors. In one or more embodiments of the invention, using the available information, an accountant using the payroll system (100) is able to provide tax preparation, advice, budget planning, and other accounting services to both employers and employees in the payroll system (100).

In one or more embodiments of the invention, the employer data repository (125), accountant data repository (130), and employee data repository (135) are stored in one or more databases, which may be flat, hierarchical, network based, relational, dimensional, object modeled, or other database model. For example, each repository (e.g., employer data repository (125), accountant data repository (130), employee data repository (135)) may be maintained in a table of a SQL database. In addition, entries in each repository (e.g., employer data repository (125), accountant data repository (130), employee data repository (135)) are linked to entries in other repositories. For example, each entry in each repository (e.g., employer data repository (125), accountant data repository (130), employee data repository (135)) may be associated with a primary key or unique ID. An employer's entry in the employer data repository (125) may be identified with a unique employer ID, an employee's entry in the employee data repository (135) may be identified using a unique employee ID, and an accountant's entry in the accountant data repository (130) may be distinguished from others with a unique accountant ID. An employer's entry in the employer data repository (125) may also contain a list of employees and information about each employee. Instead of storing all of the information within the employer's entry in the employer data repository (125), the employer's entry may simply contain a list of employee IDs from the employee data repository (135). The payroll system (100) is then able to retrieve information about an employee for an employer by running a query for an employee's entry using the employee's unique ID, receiving a response from the database containing the employee's information, and transferring the data back to the employer. As an example, a query in a SQL database may use the keywords "join" or "union" to search the employee table using employee IDs from the employer table and return results corresponding to the employee IDs.

Likewise, an employee's entry in the employee data repository (135) may include a field for the employee's place of employment. Instead of storing all of the information about the employee's company within the employee's entry, the employee's entry may simply contain the employer ID of his company of employment. Any information needed by the employee about the company is provided by performing a database query of the employer data repository (125) using the company's employer ID and relaying the result to the employee. Further, an accountant's list of clients in the accountant data repository (130) may be a list of employer IDs and employee IDs that map to entries in the employer data repository (125) and employee data repository (135).

In addition, changes in one entry in a repository (e.g., employer data repository (125), accountant data repository (130), employee data repository (135)) are easily synchronized with entries in the other repositories. For example, if an employee changes companies, the company ID of the employee's entry in the employee data repository (135) is changed from the old company's ID to the new company's ID. Each company's entry in the employer data repository (130) is correspondingly updated; the employee's ID would be removed from the old company's list of employees, and the employee's ID would be added to the new company's employee roster. An accountant serving the old employer, new employer, and/or employee would be able to view the change because the change is already reflected in the employee's entry in the employee data repository (135) and in both employers' entries in the employer data repository (125). As a result, the accountant's entry in the accountant data repository (130) does not need to be changed unless he/she has a change in clientele.

While the invention has been described with separate data repositories (i.e., one for the employer, one for the accountant, and one for the employee), one skilled in the art will appreciate that a single data repository may be used to hold all data associated with the payroll system. Likewise, while the data repositories might each be separate, a single database may hold all data repositories or various combinations thereof. Further, the data repository may take the form of any acceptable data storage mechanism to store and retrieve payroll data. Even further, a data repository used with a payroll system often includes data protection and security schemes to protect sensitive data from corruption, theft, attack, destruction, and other forms of intrusion and loss of integrity.

In one or more embodiments of the invention, the identity management system (120) is responsible for synchronizing changes in one repository (e.g., employer data repository (125), accountant data repository (130), employee data repository (135)) with entries in the other repositories. The identity management system (120) may form a part of the relational database containing the repositories (e.g., employer data repository (125), accountant data repository (130), employee data repository (135)), or the identity management system (120) may be a standalone application or a separate part of the payroll system (100). Aside from synchronizing the data repositories (e.g., employer data repository (125), accountant data repository (130), employee data repository (135)) in the payroll system (100), the identity management system (120) also performs data synchronization with one or more benefit providers (e.g. benefit provider 1 (140), benefit provider n (145)) outside the payroll system (100).

In one or more embodiments of the invention, a benefit provider (e.g. benefit provider 1 (140), benefit provider n (145)) is a third party organization that offers employment-related services to employees. Examples of benefit providers (e.g. benefit provider 1 (140), benefit provider n (145)) include health insurance companies, life insurance companies, dental insurance companies, retirement plans, flexible spending accounts, tax filing services, bill payment services, and other employment-related services. Because the benefit providers (e.g. benefit provider 1 (140), benefit provider n (145)) are not a part of the payroll system (100), the payroll system (100) must interface with each benefit provider to exchange information and funds so that employer, employees, and/or accountants can receive the benefits.

In one or more embodiments of the invention, the identity management system (120) provides data about employers, employees, and/or accountants to benefit providers (e.g. benefit provider 1 (140), benefit provider n (145)), as well as payments for services provided by the benefit providers. In addition, the identity management system (120) may receive information from the benefit providers (e.g., benefit provider 1 (140), benefit provider n (145)) and relay the information to the employers, employees, and/or accountants the information is intended for. For example, if an employee signs up for health insurance through the payroll system (100), the employee would use the employee interface (115) to indicate the health coverage plan desired, the number of people covered under the plan, information about members covered under the plan, and other information needed by the health insurance company. The identity management system (120) would then send the employee's preferences, as well as information about the employee found in the employee data repository (135), to the health insurance company. The health insurance company may then enroll the employee, and possibly other members of the employee's family, in the coverage plan of the employee's choice. The health insurance company may also send data back to the identity management system (120), such as the employee's policy ID and other details about the employee's healthcare coverage. The identity management system (120) then relays the information to the employee in the form of a message, email, letter, or other form of notification.

Those skilled in the art will appreciate that each benefit provider (e.g. benefit provider 1 (140), benefit provider n (145)) may have its own internal representation of identity data pertaining to an employer, employee, or accountant. For example, one benefit provider (e.g. benefit provider 1 (140), benefit provider n (145)) may use Extensible Markup Language (XML) to store information about an employee, whereas another benefit provider may use Lightweight Directory Access Protocol (LDAP). In addition, benefit providers (e.g. benefit provider 1 (140), benefit provider n (145)) that use the same protocol may have different fields corresponding to the same piece of data, such as a person's last name. As a result, the identity management system (120) may communicate with benefit providers (e.g. benefit provider 1 (140), benefit provider n (145)) through multiple interfaces. In one or more embodiments of the invention, a customized interface between the payroll system (100) and a benefit provider (e.g. benefit provider 1 (140), benefit provider n (145)) is created by the identity management system (120) when the benefit provider begins offering services in the payroll system (100). The customized interface may include a mapping of relevant fields in the data repositories (e.g., employer data repository (125), accountant data repository (130), employee data repository (135)) of the payroll system (100) and any user-supplied information in one or more forms to any repositories of the benefit provider (e.g. benefit provider 1 (140), benefit provider n (145)), as well as a mechanism for transferring funds from the payroll system (100) to the benefit provider to pay for the benefits.

As shown in FIG. 1, the employer interface (105) includes an employee payroll management module (155), a business tax management module (160), and a human resources management module (165). The employee payroll management module (155) allows an employer to manage the payroll of his/her employees. In one or more embodiments of the invention, the employee payroll management module (155) calculates an employee's gross to net pay and issues paychecks to employees. An employer may specify each employee's salary and/or hourly wage, hours worked by the employee, any commission or overtime earned by the employee, the pay period of each paycheck, and other parameters related to the employee's position. Based on that information, the employee payroll management module (155) calculates the necessary paycheck information needed for each employee based on the employee's net pay, any additional payments to the employee such as bonuses, overtime, and reimbursement for expenses, and deductions such as federal income tax, state income tax, social security, and Medicare tax.

The business tax management module (160) allows an employer to calculate taxes owed by the company. For example, the company may need to send tax withholdings from employees' income, as well as contributions of its own such as social security matching contributions and tax on revenue, to the Internal Revenue Service (IRS). In one or more embodiments of the invention, the business tax management module (160) provides tax forms to an employer for calculating taxes owed to the government. Additionally, the business tax management module (160) may provide information about the employer's tax rates based on data supplied by the employer and help the employer calculate any taxes owed to the government. The business tax management module (160) may also provide electronic filing services to the employer, as well as electronic payment of taxes.

The human resources management module (165) provides human resources-related services to the employer. The human resources management module (165) may provide features that allow an employer to manage the salaries, bonuses, roles, promotions, and other job-related aspects of his employees and keep track of possible candidates for employment. For example, the human resources management module (165) may allow an employer to enter performance reviews for employees, keep track of hours logged for each employee, report new hires, maintain a list of resumes for prospective employees, handle employee benefit enrollment functions, provide functionality to intake new employees, and perform other human resources related functions. The human resources management module (165) may also include a directory of employees the employer can browse or search. The directory may list each employee's contact information, shifts the employee is assigned to, a picture of the employee, and other information about the employee.

In one or more embodiments of the invention, the employer is allowed to access basic features such as the employee payroll management module (155) and basic tax calculation services of the business tax management module (160) at no cost. In order to perform functions such as electronic filing or electronic payment of taxes in the business resources management module (165), or to use the human resources management module (165), the employer must pay a fee for one or more bonus features of the employer interface (105). Other bonus features of the employer interface (105) may include a service for filing and paying payroll tax on behalf of the employer, accounting software for the employer to keep track of other aspects of his/her business, and any services provided by accountants in the payroll system (100).

In one or more embodiments of the invention, the accountant interface (110) includes a client collaboration tool (170), a tax preparation tool (175), and a marketing management tool (180). As stated above, the accountant interface (110) allows an accountant to access the payroll system (100) and provide accounting services to both employers and employees. The components (e.g., client collaboration tool (170), tax preparation tool (175), marketing management tool (180)) of the accountant interface (110) allow an accountant to find new clients, both business (employers) and consumer (employees), communicate with clients, and provide accounting assistance to clients.

The client collaboration tool (170) allows an accountant to communicate with clients and send and/or receive necessary information for preparing accounts for the client. The client collaboration tool (170) may include features such as messaging or instant messaging with clients, file transfer to/from clients, and other communication and transfer methods. The client collaboration tool (170) may also include voice functionality, such that the accountant is able to communicate with the client over a network-based phone (i.e., Voice over Internet Protocol (VoIP)). The accountant is able to use the client collaboration tool (170) to gather all necessary information from the client to perform accounting tasks for the client, such as tax filing or estate planning, as well as to answer any questions or comments the client may have.

The tax preparation tool (175) allows the accountant to prepare tax filing forms for the client. In one or more embodiments of the invention, the tax preparation tool (175) includes forms for both business filings (i.e., for employers in the payroll system (100)) and consumer filings (i.e., for employees in the payroll system (100)). In addition, the tax preparation tool (175) may include spreadsheets, calculators, guidelines, and other resources to help the accountant prepare tax filings for clients. For example, the tax preparation tool (175) may contain a list of common accounting and tax preparation formulas for the accountant to calculate taxes owed by a client, as well as a graphing utility so that the accountant can present the results of his/her calculations to the client in an understandable form.

The marketing management tool (180) of the accountant interface (110) enables the accountant to find new clients within the payroll system (100). In one or more embodiments of the invention, the accountant pays for access to employers and employees in the payroll system (100). The accountant then receives a list of possible clients and means for contacting the clients. For example, the list may include a client's first and last name, status (employer or employee), an email address or alias of the client within the payroll system (100), and/or other information about the potential client. Using the list, the accountant may then contact the potential clients and announce the availability of his/her services to them, as well as the rates charged for those services. In one or more embodiments of the invention, the accountant's access fee is based on the level of visibility desired by the accountant. For example, an accountant may pay a lower fee for acquiring a list of 20 possible clients, whereas the accountant may pay a higher fee for lists of 50 or 100 possible clients. Further, the accountant may pay a fee for automatically advertising his/her services to employers and employees in the payroll system (100) without the accountant having to contact the employers and/or employees individually.

In one or more embodiments of the invention, the employee interface (115) includes a consumer tax management module (185), a payroll account management module (190), and a benefits management module (195). The employee interface (115) allows an employee to manage his/her paychecks, file tax forms and pay taxes, and enroll in and manage benefits offered by the benefit providers (e.g., benefit provider 1 (140), benefit provider n (145)). In one or more embodiments of the invention, a new employee of an employer in the payroll system (100) is pointed to the employee interface for filling out new hire forms, such as I-9 or W-4 forms, registering in the payroll system (100), and/or completing other new hire functions. As stated above, the employer may pay a fee for new hire reporting features in the payroll system (100).

The consumer tax management module (185) provides the employee with basic functionality to prepare tax filing forms. In addition, the consumer tax management module (185) may allow the employee to file and pay taxes electronically, or to receive a tax refund from the government through the payroll system (100). The consumer tax management module (185) may be configured such that certain features, such as completion of tax forms, is free to the employee, whereas other features, such as electronic filing and payment/refund of taxes, are offered at a fee.

In one or more embodiments of the invention, the payroll account management module (190) allows the employee to manage his/her paychecks. In one or more embodiments of the invention, the paycheck management is performed in a manner described in the patent application owned by the same assignee and filed concurrently with this application, namely patent application Ser. No. 11/592,360 filed on Nov. 3, 2006 entitled "METHOD AND SYSTEM FOR GENERATING AND PROCESSING AN ELECTRONIC PAYROLL VOUCHER" with the Inventors Terry Hicks and Paul Rosenfeld, which is hereby incorporated by reference.

In one or more embodiments of the invention, each employee in the payroll system (100) is associated with a deposit account in the payroll system (100). When the employee is paid, the funds are deposited directly into the deposit account as a direct deposit paycheck and displayed to the employee. The payroll account management module (190) includes the ability for the employee to divert funds from the deposit account to other accounts, such as bank accounts, brokerage accounts, and retirement accounts. The payroll account management module (190) may also include debit card access to funds in the deposit account, investment of the funds in the deposit account in a money market fund or other fund, accounting software for managing paychecks and budgets, and bill pay services from the deposit account. As with the consumer tax management module (185), some features of the payroll account management module (190) may be offered to the employee for free, and others for a fee. For example, the employee may be able to transfer funds from the deposit account to a bank accounts for free, but may be charged a fee for paying a credit card bill from the deposit account.

The benefits management module (195) offers benefits from benefit providers (e.g., benefit provider 1 (140), benefit provider n (145)) to the employee. For example, the employee is given options by the benefits management module (195) to enroll in medical plans, life insurance plans, one or more Individual Retirement Accounts (IRAs), 401k plans, and/or other benefits. In one or more embodiments of the invention, benefits are offered to the employee by the payroll system (100) because the employer does not offer benefits directly to the employee. In one or more embodiments of the invention, the cost of the benefit and an additional management fee are deducted from the employee's paycheck and/or deposit account when the employee signs up for a benefit from a benefit provider (e.g., benefit provider 1 (140), benefit provider n (145)) through the payroll system (100). Further, the identity management module (120) of the payroll system (100) retrieves data from the employee's entry in the employee data repository (135) and transfers the data to the benefit provider (e.g., benefit provider 1 (140), benefit provider n (145)) through a customized interface so that the employee does not need to fill in information repeatedly and unnecessarily. Any additional information needed by the benefit provider (e.g., benefit provider 1 (140), benefit provider n (145)) is provided by the employee via an online form, email, phone call, or other medium. The additional information is also supplied to the benefit provider (e.g., benefit provider 1 (140), benefit provider n (145)) by the identity management module (120) via the customized interface with the benefit provider.

Figure 2:
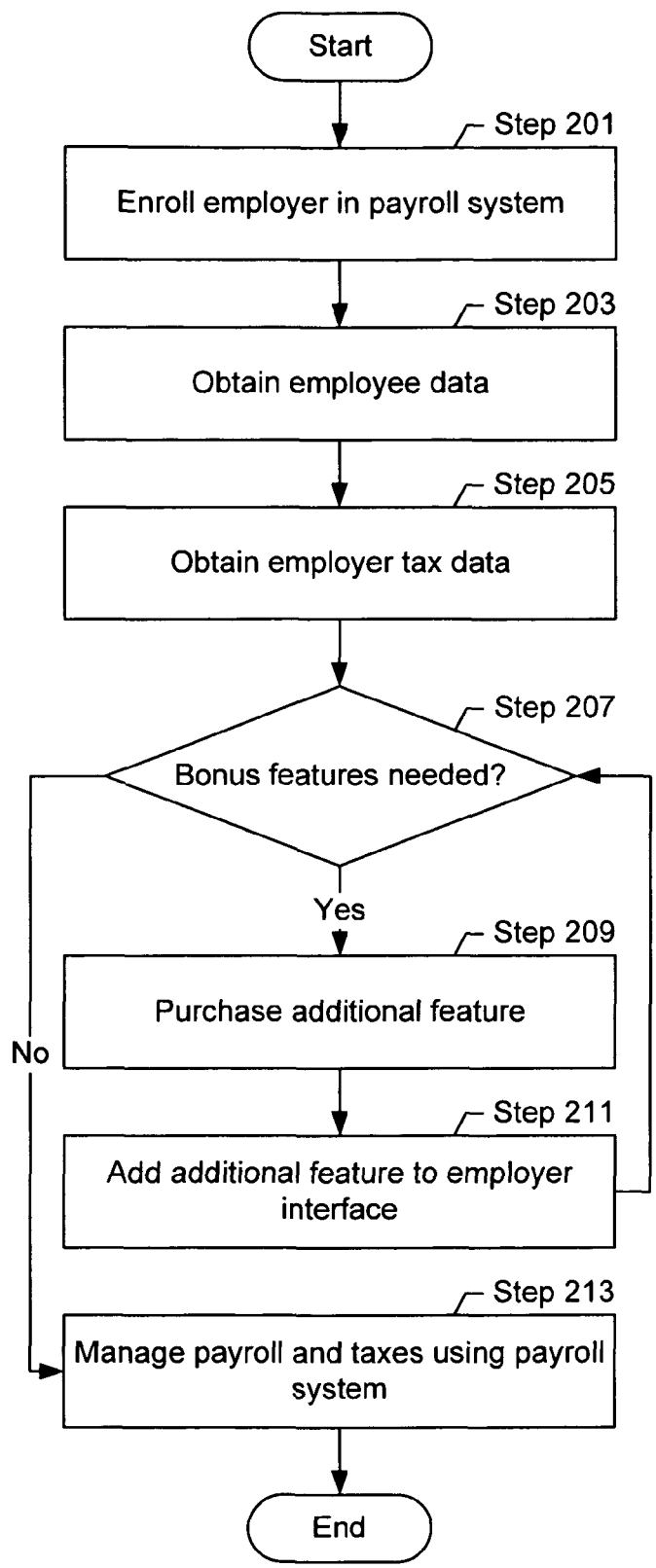
FIGS. 2-4 show flow diagrams in accordance with one or more embodiments of the invention.

FIG. 2 shows a flow diagram of an employer interaction with the payroll system. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, the employer is enrolled in the payroll system (Step 201). In order to enroll, the employer may create a login and password for the payroll system, as well as fill out forms about his/her business. The forms may ask for information such as the name of the business, number of employees, the business's annual income, type of business, and other details regarding the business. The information about the employer is then stored as an entry in the employer data repository. Once the employer is enrolled in the payroll system, information about the employees of the business is obtained (Step 203). The information may be provided by the employer, or the employer may submit a list of employees and direct the employees to fill out additional information themselves using the employee interface. Alternatively, if an employee is already entered into the payroll system (e.g., through a previous job), the identity management module automatically retrieves the employee's information and associates the information with the employer. Further, the employees may be entered in the system before the employer enrolls in the system. Employee information may include employee name, age, contact information, social security number, annual income, position in the company, and other data regarding the employee. Each employee will also supply a login and password when registering with the payroll system. In one or more embodiments of the invention, each employee of the company corresponds to an entry in the employee data repository. Information entered by the employee is stored in the entry, as are payroll preferences, deposit account balances and transfers, benefits the employee has elected to receive, accounting documents created by the employee or by an accountant on the employee's behalf, and/or other documents and preferences.

Tax information about the employer is also obtained (Step 205). In one or more embodiments of the invention, some of the tax information is found with the company information provided by the employer in Step 201. However, other information, such as deductions the employer is eligible for, may need to be additionally obtained so that the payroll system can accurately perform payroll calculations for the employer.

The employer may choose to register for additional bonus features offered by the payroll system (Step 207). If no additional features are needed, the employer is finished setting up and can use the payroll system to manage his/her payroll and taxes (Step 213). Otherwise, the employer purchases an additional feature (Step 209). The additional feature may be new hire reporting within the payroll system, electronic filing of tax returns, electronic payment of taxes, tax filing and preparation services offered by benefit providers or accountants, use of accounting software within the payroll system, use of human resources software within the payroll system, or another service offered by the payroll system. Once the bonus feature is purchased, the feature is enabled in the employer interface of the employer (Step 211) and accessible by the employer. Once the employer has finished electing bonus features of the payroll system, the employer is done with setup and can begin processing paychecks and taxes for the company. Those skilled in the art will appreciate that the employer may change details and/or preferences within the payroll system at any time. For example, the employer may prefer to personally file the company's taxes one year, then switch to a tax preparation service or accountant for tax filing in subsequent years because the company has grown larger. In addition, the employer can update changes in the company's size, employees, annual income, name, location, or other related information at any time.

Figure 3:
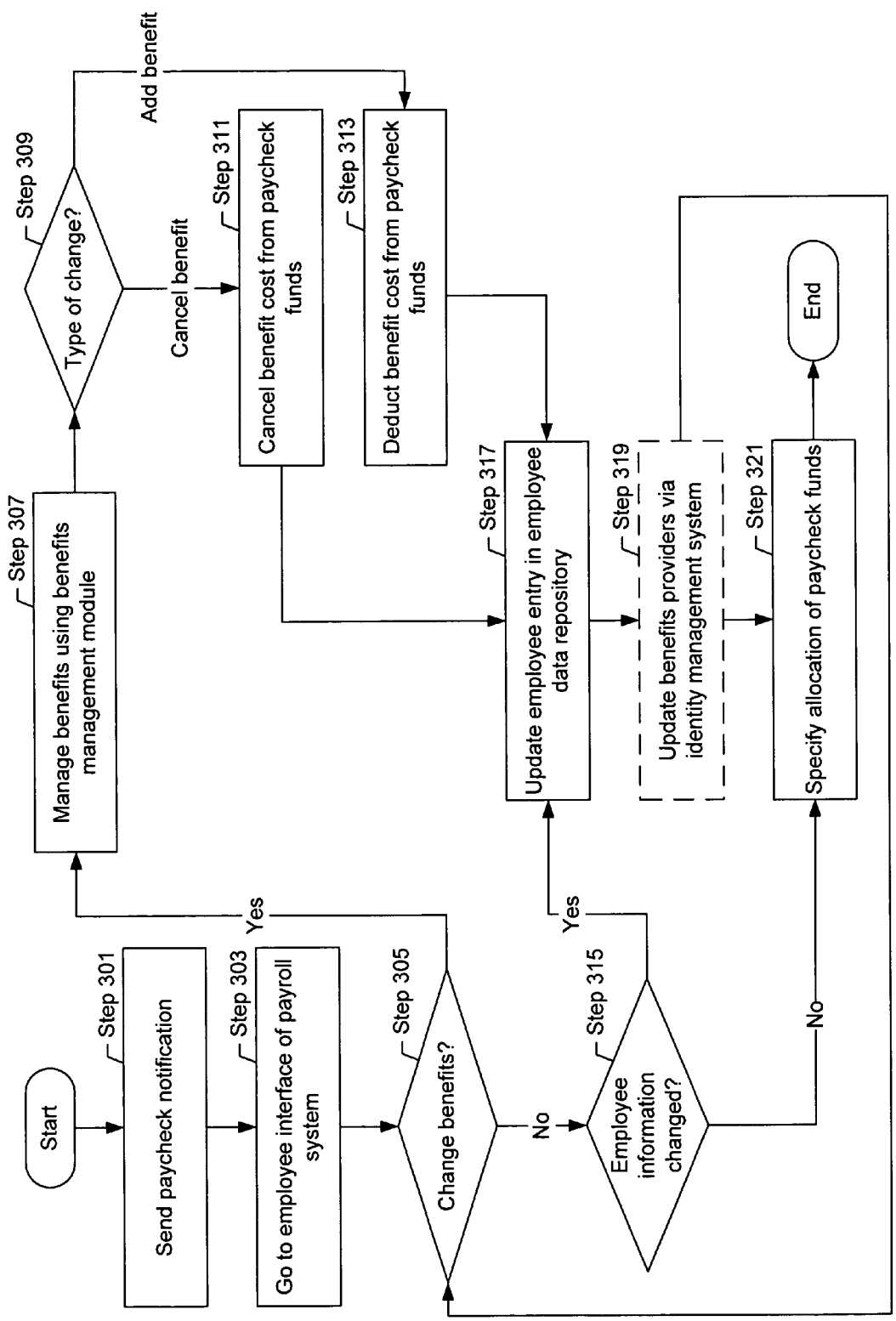

FIG. 3 shows a flow diagram of an employee interaction with the payroll system in accordance with one or more embodiments of the invention. In one or more embodiments of the invention, the employee interaction is performed in a manner described in the patent application owned by the same assignee and filed concurrently with this application, namely patent application Ser. No. 11/592,360 filed on Nov. 3, 2006 entitled "METHOD AND SYSTEM FOR GENERATING AND PROCESSING AN ELECTRONIC PAYROLL VOUCHER" with the Inventors Terry Hicks and Paul Rosenfeld, which has been incorporated by reference.

In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, a paycheck notification (also known as a voucher) is sent to the employee (Step 301). The paycheck notification may be in the form of an email, a text message on a cellular phone, an automated voicemail, or other type of alert. In one or more embodiments of the invention, the employee may choose one or more methods by which the paycheck notification is sent, or the employee may choose to not receive any paycheck notifications.

Once the employee receives notification of a paycheck, the employee accesses the employee interface of the payroll system (Step 303). This may be accomplished by providing a login and password corresponding to the employee. As stated above, the employee may register with the payroll system when the employee is hired by a company in the payroll system. At registration time, the employee may provide information such as full name, age, address, telephone number, social security number, or other details necessary to create an account on the payroll system. The employee may also fill out employment forms, such as I-9 or W-4 forms, to verify employment eligibility and specify withholdings on the employee's pay. The information provided by the employee is then stored in an entry in the employee data repository corresponding to the employee.

The employee may also choose to change his/her benefits under the payroll system (Step 305). If the employee decides to make a change in benefits, the change is made using the benefits management module (Step 307) in the employee interface. In the benefits management module, the employee may decide to add a benefit or cancel a benefit (Step 309). If the employee adds a benefit, the benefit cost is deducted from the employee's paycheck funds in the employee's deposit account (Step 313). If the employee decides to cancel a benefit, the benefit cost is cancelled from the paycheck funds (Step 311). In one or more embodiments of the invention, a benefit cost is accompanied by a management fee when the employee signs up for a benefit. Further, an addition or removal of a benefit may not take place until the next cycle dictated by the benefit provider. For example, an employee may choose to join a 401k plan, but may not be able to enroll until the next quarterly cycle begins. Similarly, the employee may decide to cancel his/her dental insurance, but the change will not take effect until the beginning of the next month. In one or more embodiments of the invention, the employee is not charged for a new benefit until the new benefit is in place. Likewise, the employee is charged for an existing benefit until the benefit is fully cancelled and the employee no longer receives services from the benefit.

Other than adding or cancelling a benefit, an employee may also choose to change an existing benefit. For example, the employee may decide to upgrade to a more comprehensive healthcare plan, or change the per-paycheck contribution to a flexible spending account. Consequently, the employee's paychecks are updated to reflect the change. If the change is more costly (e.g., a health insurance upgrade), additional funds are deducted from the employee's deposit account. If the change is less costly (e.g., contributing less to a flexible spending account), more of the employee's paycheck is placed into the employee's deposit account. In addition, changes to existing benefits may not take place until the next benefit cycle begins. As a result, the employee's paycheck may not reflect the change until the change to his/her benefits is fully enacted.

Once the employee has finished changing his/her benefits, the employee's entry in the employee data repository is updated (Step 317) to reflect the change. For example, the employee's entry may include a list of benefits the employee subscribes to. Additions, changes, or cancellations of benefits by the employee are reflected in the employee's list of benefits. For example, if the employee changes healthcare plans, the old healthcare plan is removed from the employee's list of benefits and the new healthcare plan is added. Once the employee's entry in the employee data repository is updated, the identity management system of the payroll system updates the benefit providers with the changes (Step 319). For instance, if the employee cancels his health insurance, the identity management system communicates the cancellation to the health insurance provider, which updates the employee's status in the provider's records.

The employee continues updating benefits as needed (Step 305-319) until the employee is finished. Next, the employee may decide to change his/her personal information (Step 315). For example, if the employee has moved or married, the employee's address or name may be different from what is stored in the employee's entry in the employee data repository. As a result, the employee updates the records in the payroll system. To do so, the employee may fill out an online form in the employee interface, send an email to the payroll system, speak to a representative over the phone, or otherwise communicate the change to the payroll system. Once the change is communicated with the payroll system, the employee's entry in the employee data repository is updated (Step 317) to reflect the change. In one or more embodiments of the invention, the employer of the employee is able to change certain fields of the employee's entry. For example, if the employee has left the company, the employer is able to indicate the change in employment status from the employer interface. The employer's entry in the employer data repository is then updated to remove the employee from the employee roster, and the employee's entry in the employee data repository is updated to indicate that the employee no longer works at the company of the employer.

Once the employee has made all necessary changes, the employee specifies an allocation of paycheck funds (Step 321). For example, the employee may choose to send 50% of the funds to a savings account, 30% of the funds to a brokerage account, and keep 20% of the funds in the deposit account. As mentioned previously, the deposit account may include incentives such as debit card access or interest earning opportunities that may encourage the employee to leave some money in the deposit account. In addition, the employee may create multiple paycheck fund allocations and save them in the payroll system. For example, one paycheck fund allocation may transfer all of the paycheck to the employee's checking account, while another paycheck fund allocation may divide the employee's paycheck between the employee's bank account and brokerage account. The employee may then choose a fund allocation for a given paycheck based on financial circumstances and/or personal preference. Further, the distribution of paycheck funds may be allocated to accounts or products associated with third parties (i.e., individuals or entities other than the employee). For example, paycheck funds may be allocated to a child, a relative, a credit card company, a mortgage company, or another third-party recipient.

Figure 4:
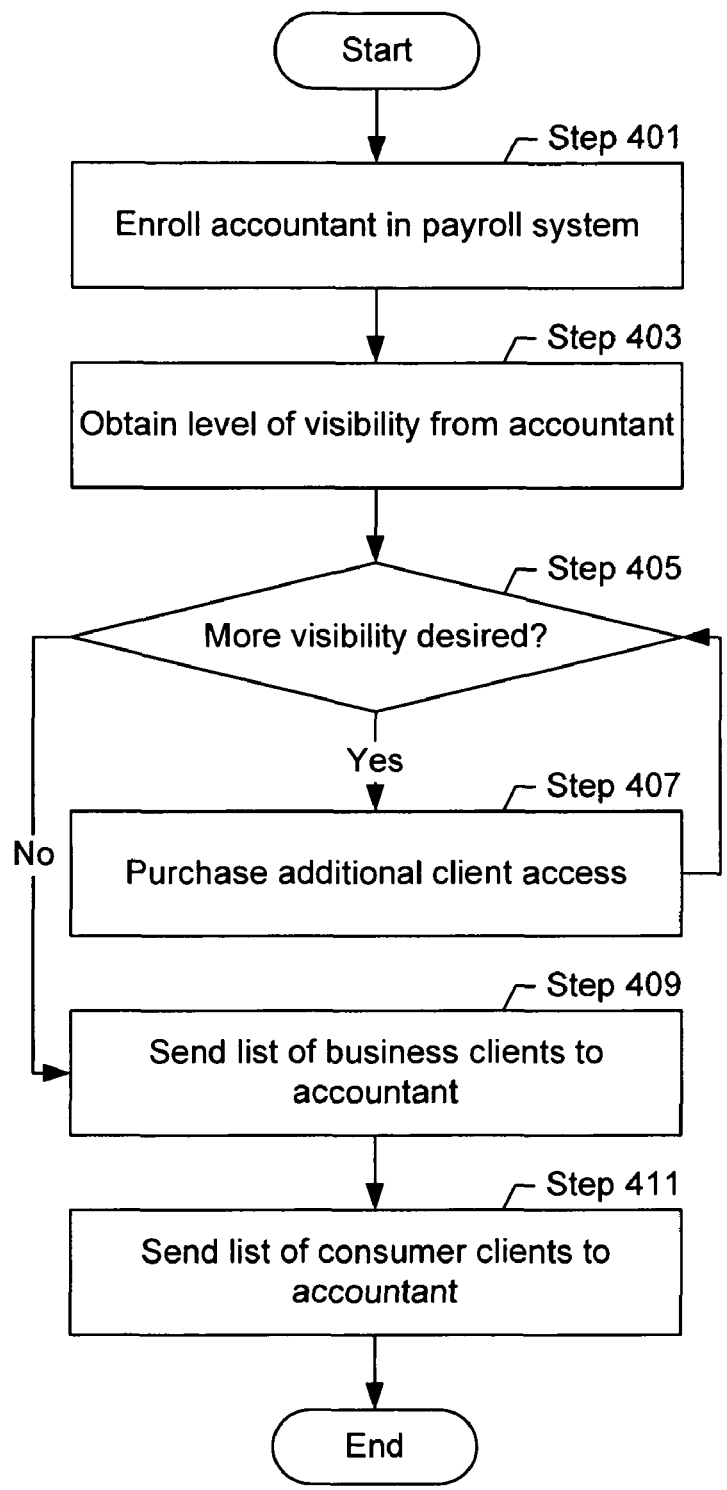

FIG. 4 shows a flow diagram of an accountant interaction with the payroll system in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, the accountant is enrolled in the payroll system (Step 401). The accountant enrolls in the payroll system by specifying a login and password and providing information such as name, contact information, social security number, and other information necessary for creating an account on the payroll system. In addition, the accountant may provide credentials such as education, experience, or Certified Public Accountant status. The accountant may also indicate the types of services he/she is able to offer to employers and/or employees.

Once the accountant is enrolled, a level of visibility is obtained from the accountant (Step 403). As stated above, the accountant's level of visibility dictates the amount of access the accountant has to employers and employees of the payroll system. In one or more embodiments of the invention, the accountant receives a list of potential clients in the payroll system to contact. The list of clients may be longer or shorter depending on the level of visibility the accountant has paid for. In addition, the accountant may pay an advertising fee for advertising within the payroll system, such that employers or employees logging into the payroll system will see the accountant's contact information and/or credentials within the employer or employee interface. In one or more embodiments of the invention, clients (employers and employees) are allowed to specify the types of accounting services desired. The payroll system then matches the clients with accountants who are able to perform the specified services and provides contact information to one or both sides. In addition, the payroll system may charge the clients and/or the accountants a matching fee for the matching service.

The accountant may also decide to change his/her level of visibility (Step 403) in the payroll system. For example, if an accountant cannot find enough business with the current level of visibility, the accountant may choose to purchase a higher level of visibility (Step 407). The accountant would then receive more opportunities to contact clients and can continue purchasing client access (Step 407) until the accountant has reached a desired level of visibility.

Once the accountant has finished specifying his level of visibility, the accountant receives a list of business clients (Step 409). In one or more embodiments of the invention, business clients correspond to employers in the payroll system. Business clients may request services such as tax preparation, payroll calculation, and other accounting transactions and services, from the accountant. Next, the accountant receives a list of consumer clients (Step 411). In one or more embodiments of the invention, consumer clients correspond to employees in the payroll system. Consumer clients may look for services such as tax filing, retirement planning, estate planning, budgeting, and other services related to personal finance, from the accountant. In one or more embodiments of the invention, an employer or employee may request both business-related and consumer-related services from the accountant.

Figure 5:
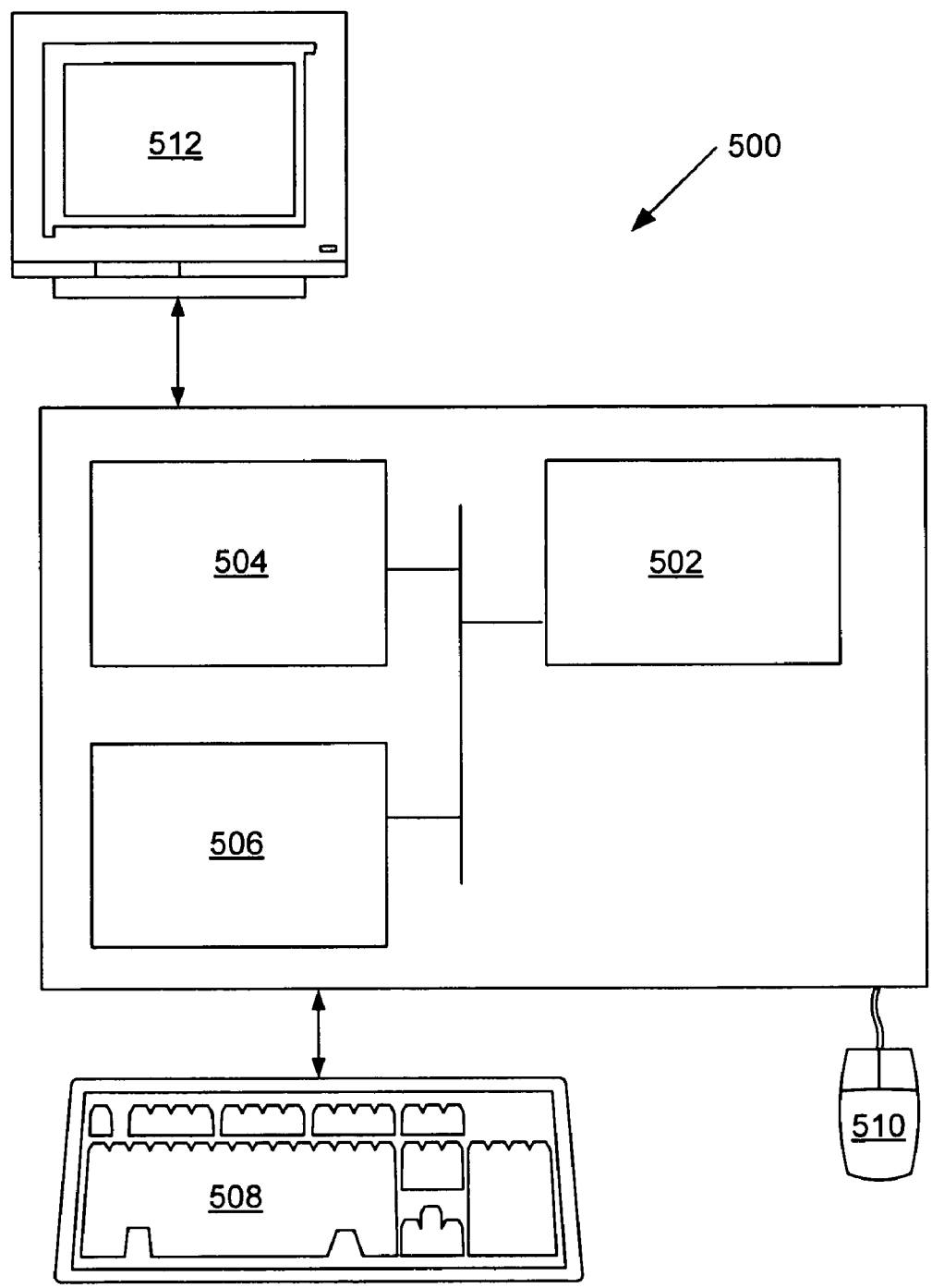
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., payroll system, benefit providers, identity management system, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing payroll services to an employer, comprising:
   obtaining employee data for an employee of the employer, wherein the employee data is used by a payroll system;
   obtaining employer tax data of the employer, wherein the employer tax data is used by the payroll system;
   managing a payroll and taxes of the employer using the payroll system, wherein managing the payroll of the employer comprises issuing a direct deposit paycheck by the payroll system based on the employee data and employer tax data;
   enrolling an accountant in the payroll system, wherein the accountant is a third party business entity;
   obtaining an access fee from the accountant based on a size of a list of potential clients,
   wherein the list of potential clients comprises the employee and the employer; and
   sending the list of potential clients to the accountant,
   wherein managing the payroll of the employer and taxes of the employer is provided by the payroll system at no cost to the employer and employee by obtaining the access fee.

2. The method of claim 1, further comprising:
   enrolling the employer in the payroll system providing payroll services.

3. The method of claim 1, further comprising:
   providing a bonus feature of the payroll services to the employer based on an election of the bonus feature by the employer; and
   obtaining a fee from the employer for enrolling in the bonus feature.

4. The method of claim 3, wherein the bonus feature is at least one selected from a group consisting of a new hire reporting, an electronic tax form filing, an electronic payroll tax payment, a tax filing and payment service, an accounting service, and a human resources service.

5. The method of claim 3, wherein the bonus feature is provided by an accountant in the payroll system.

6. The method of claim 1, further comprising:
   providing a benefits option through the payroll system to the employee; and deducting a cost of the benefits option and a management fee from an amount of the direct deposit paycheck in response to an election of the benefits option by the employee, wherein the benefits option is provided by the payroll system.

7. The method of claim 1, further comprising:

receiving a change in employee data;

updating an identity management system in the payroll system with the change in employee data; and updating a benefit provider with the change in employee data using the identity management system, wherein the benefit provider provides a benefit to the employee.

8. A non-transitory computer readable storage medium containing software instructions embodied therein for causing a computer system to perform:

obtaining employee data for an employee of the employer, wherein the employee data is used by a payroll system;

obtaining employer tax data of the employer, wherein the employer tax data is used by the payroll system;

managing a payroll and taxes of the employer using the payroll system, wherein managing the payroll of the employer comprises issuing a direct deposit paycheck by the payroll system based on the employee data and employer tax data;

enrolling an accountant in the payroll system, wherein the accountant is a third party business entity;

obtaining an access fee from the accountant based on a size of a list of potential clients, wherein the list of potential clients comprises the employee and the employer; and sending the list of potential clients to the accountant, wherein managing the payroll of the employer and taxes of the employer is provided by the payroll system without cost to the employer.

9. The non-transitory computer readable storage medium of claim 8, the software instructions further comprising:

enrolling the employer in the payroll system providing payroll services.

10. The non-transitory computer readable storage medium of claim 8, the software instructions further comprising:

providing a bonus feature of the payroll services to the employer based on an election of the bonus feature by the employer; and obtaining a fee from the employer for enrolling in the bonus feature.

11. The non-transitory computer readable storage medium of claim 10, wherein the bonus feature is at least one selected from a group consisting of a new hire reporting, an electronic tax form filing, an electronic payroll tax payment, a tax filing and payment service, an accounting service, and a human resources service.

* * * * *